US012297592B2

(12) United States Patent
McGuinness et al.

(10) Patent No.: US 12,297,592 B2
(45) Date of Patent: May 13, 2025

(54) VAPOR PHASE INFILTRATION AS A TOOL TO AFFIX MOLECULES TO POLYMER SURFACES

(71) Applicant: Georgia Tech Research Corporation, Atlanta, GA (US)

(72) Inventors: Emily K. McGuinness, Atlanta, GA (US); Mark D. Losego, Atlanta, GA (US); Haley V. Manno, Atlanta, GA (US); Nicole R. McClelland, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 58 days.

(21) Appl. No.: 18/378,223

(22) Filed: Oct. 10, 2023

(65) Prior Publication Data

US 2024/0125047 A1    Apr. 18, 2024

Related U.S. Application Data

(60) Provisional application No. 63/379,219, filed on Oct. 12, 2022.

(51) Int. Cl.
| | |
|---|---|
| *D06P 5/00* | (2006.01) |
| *C08J 7/06* | (2006.01) |
| *C08J 7/12* | (2006.01) |
| *D06P 1/34* | (2006.01) |
| *D06P 1/673* | (2006.01) |
| *D06P 5/22* | (2006.01) |
| *D06P 3/24* | (2006.01) |
| *D06P 3/52* | (2006.01) |
| *D06P 3/70* | (2006.01) |

(52) U.S. Cl.
CPC .................. *D06P 5/22* (2013.01); *C08J 7/065* (2013.01); *C08J 7/12* (2013.01); *D06P 1/34* (2013.01); *D06P 1/67341* (2013.01); *C08J 2333/20* (2013.01); *C08J 2367/02* (2013.01); *C08J 2377/06* (2013.01); *D06P 3/24* (2013.01); *D06P 3/52* (2013.01); *D06P 3/70* (2013.01)

(58) Field of Classification Search
CPC .......... D06P 5/22; D06P 1/34; D06P 1/67341; D06P 3/24; D06P 3/52; D06P 3/70; D06P 1/67391; C08J 7/065; C08J 7/12; C08J 2333/20; C08J 2367/02; C08J 2377/06; C08J 2323/06; C08J 2323/12; C08J 2375/04
USPC ............................................. 8/474
See application file for complete search history.

(56) References Cited

U.S. PATENT DOCUMENTS

2022/0298379 A1\* 9/2022 Hartmann-Thompson ................. G02B 1/10

\* cited by examiner

*Primary Examiner* — Eisa B Elhilo
(74) *Attorney, Agent, or Firm* — Troutman Pepper Locke LLP; Ryan A. Schneider; Dustin B. Weeks

(57) ABSTRACT

An exemplary embodiment of the present disclosure provides a method of affixing molecules to a polymer material, comprising: placing the polymer material in a reactor; removing at least a portion of sorbed water present in the polymer material; exposing the polymer material to a metal precursor to produce an inorganic-organic polymer hybrid material; and soaking the polymer hybrid material in a solution comprising the molecules.

20 Claims, 9 Drawing Sheets

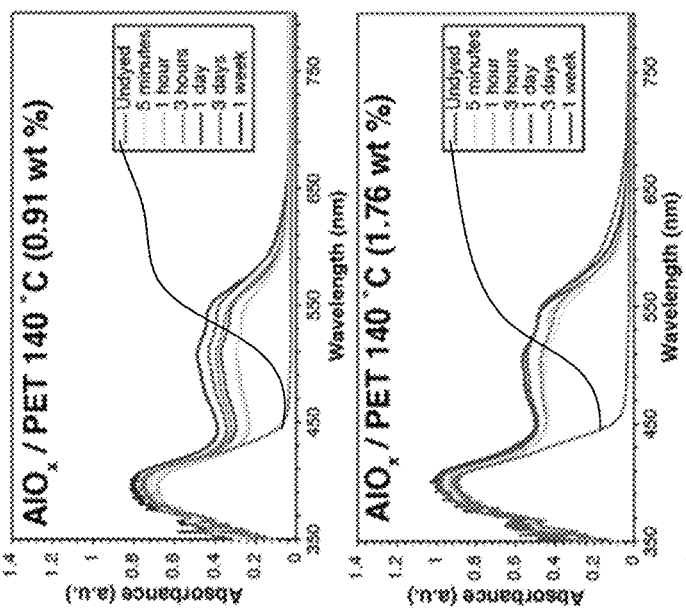
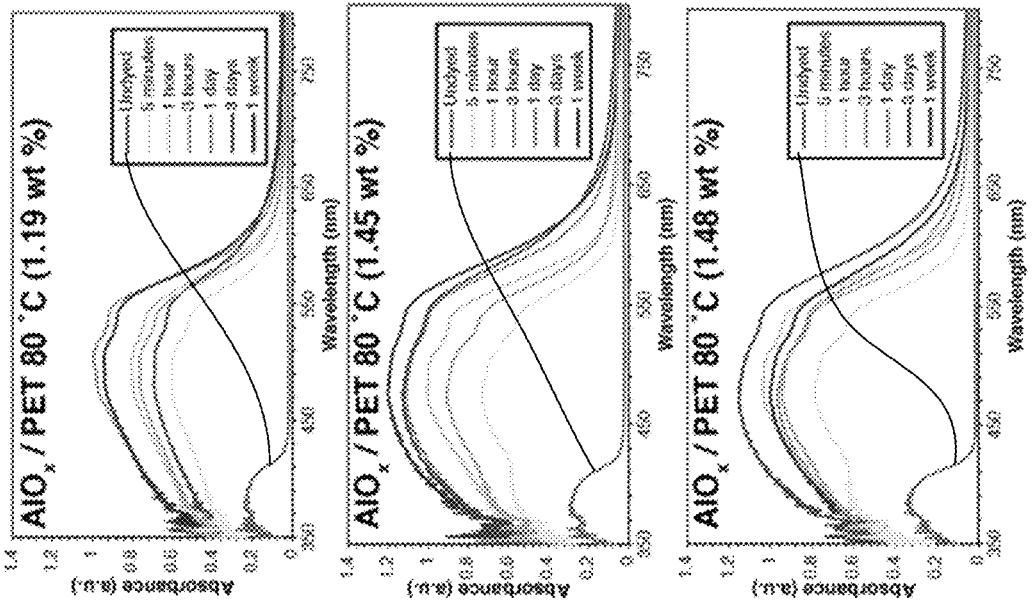
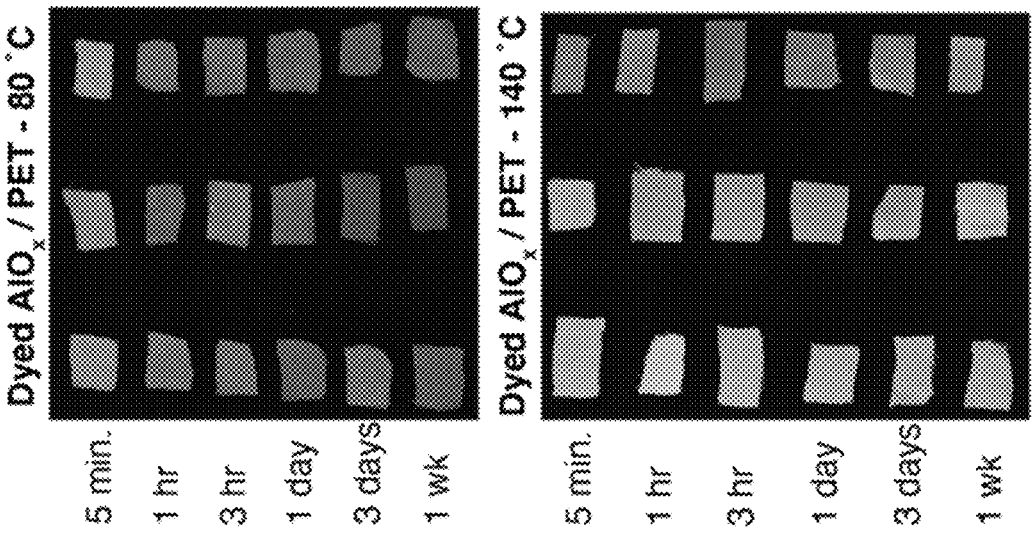

| Neat Dyed | Dyed AlO$_x$ / Fabric - 80 °C | Dyed AlO$_x$ / Fabric -140 °C |
|---|---|---|
| 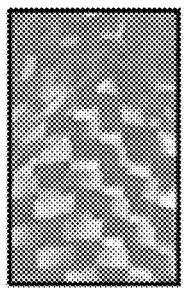 | 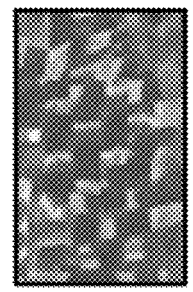 | 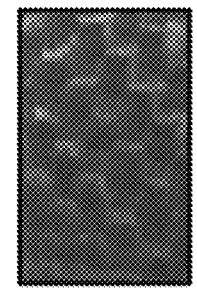 |
FIG. 7A
| | | |
|---|---|---|
| 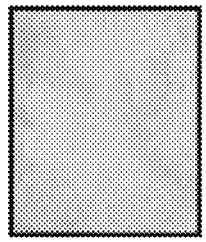 | 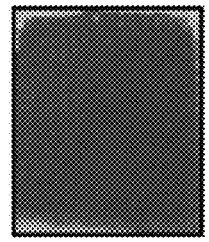 | 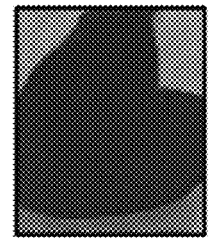 |
FIG. 7B
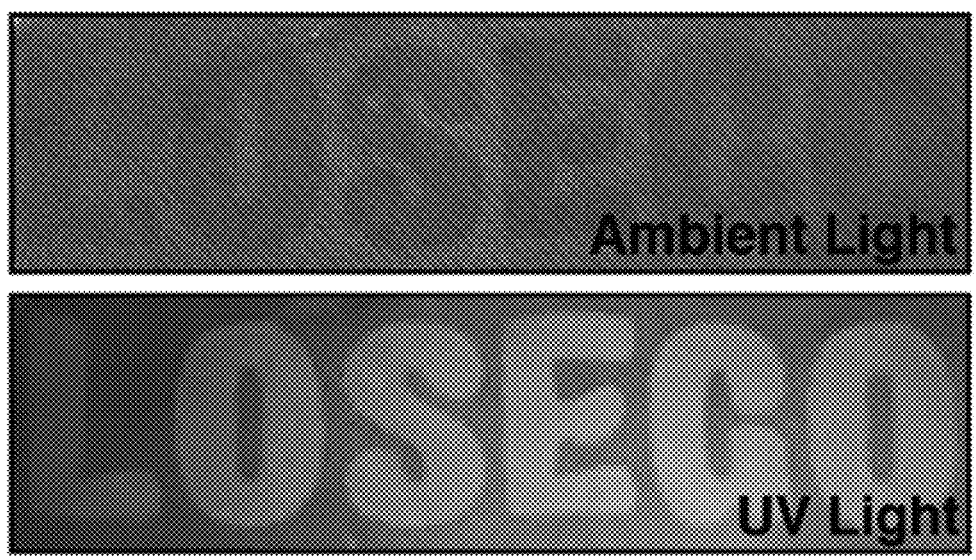
FIG. 8

|  | Osage Orange | Dactylopius Coccus |
|---|---|---|
| FIG. 9A | 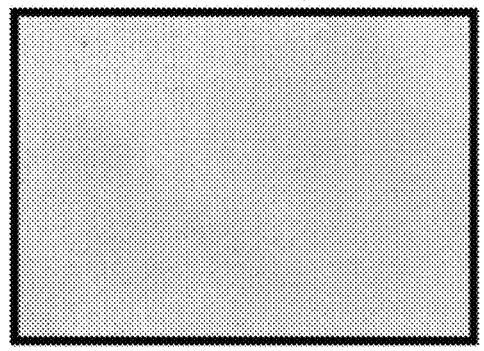 | 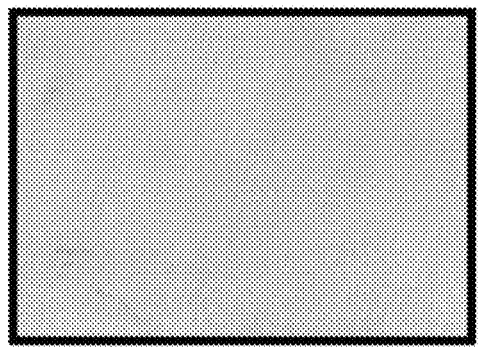 |
| FIG. 9B | | |

VAPOR PHASE INFILTRATION AS A TOOL TO AFFIX MOLECULES TO POLYMER SURFACES

CROSS-REFERENCE TO RELATED APPLICATIONS

This application claims the benefit of U.S. Provisional Application Ser. No. 63/379,219, filed on 12 Oct. 2022, which is incorporated herein by reference in its entirety as if fully set forth below.

GOVERNMENT LICENSE RIGHTS

This invention was made with government support under Agreement No. DMREF-1921873, awarded by National Science Foundation. The government has certain rights in the invention.

FIELD OF THE DISCLOSURE

The various embodiments of the present disclosure relate generally to systems and methods for affixing molecules to polymer surfaces.

BACKGROUND

Industrial textile dyeing and finishing processes are a significant environmental concern producing large quantities of wastewater that require significant treatment to remove unused synthetic chemicals. Synthetic fabrics, such as polyester, utilize high temperatures and chemical carrier agents in conventional dyeing processes. Accordingly, there is a need for improved systems and methods for affixing molecules, such as dyes, to polymer surfaces, such as polyester and other synthetic fabrics.

BRIEF SUMMARY

An exemplary embodiment of the present disclosure provides a method of affixing molecules to a polymer material, comprising: placing the polymer material in a reactor; removing at least a portion of sorbed water present in the polymer material; exposing the polymer material to a metal precursor to produce an inorganic-organic polymer hybrid material; and soaking the polymer hybrid material in a solution comprising the molecules.

In any of the embodiments disclosed herein, the method can further comprise exposing the polymer material to an oxidizing fluid.

In any of the embodiments disclosed herein, the metal precursor can comprise trimethylaluminum (TMA).

In any of the embodiments disclosed herein, the metal precursor can be in the vapor phase.

In any of the embodiments disclosed herein, the polymer material can be exposed to the metal precursor for a period of time of at least 1 second.

In any of the embodiments disclosed herein, the metal precursor can sorb into the polymer material.

In any of the embodiments disclosed herein, placing the polymer material in the reactor can comprise placing the polymer material in a reaction chamber comprising TMA and co-reactant water vapor.

In any of the embodiments disclosed herein, the reaction chamber can be at a temperature of between about 25° C. and 400° C. for at least a portion of the method.

In any of the embodiments disclosed herein, the polymer hybrid material can be an air-stable ALOx/polymer hybrid material.

In any of the embodiments disclosed herein, the polymer material can be selected from the group consisting of a polyester fabric, polyethylenetherephthalate, kevlar, polyacrylonitrile (PAN), nylon, cellulose acetate, spandex, aramid, nomex, rayon, acrylic, polyurethane, polyethylene, polypropylene, polystyrene, neoprene, dacron, modal, lyocell, acetate, cupro, and tencel.

In any of the embodiments disclosed herein, the reactor can comprise: a reaction chamber; a purge gas chamber in fluid communication with the reaction chamber; a water source in fluid communication with the reaction chamber; a vacuum pump configured to apply a vacuum to the reaction chamber; and a precursor source in fluid communication with the reaction chamber.

In any of the embodiments disclosed herein, the polymer material can be a synthetic fabric and the molecules comprise a dye.

Another embodiment of the present disclosure provides a method of dying a polymer material, the method comprising: placing the polymer material in a reaction chamber; performing a vapor phase infiltration process on the polymer material with a metal precursor in the reaction chamber to create an inorganic-organic polymer hybrid material; and exposing the inorganic-organic polymer hybrid material to a dye.

In any of the embodiments disclosed herein, the method can further comprise heating the reaction chamber to a temperature between 25° C. and 400° C.

In any of the embodiments disclosed herein, the vapor phase infiltration process can comprise: decreasing a pressure inside the reaction chamber; removing at least a portion of sorbed water in the polymer material; exposing the polymer material to the metal precursor; and exposing the polymer material to an oxidizing fluid to co-react with the metal precursor.

In any of the embodiments disclosed herein, the vapor phase infiltration process can further comprise purging the reaction chamber using a purge gas.

In any of the embodiments disclosed herein, one or more parameters of the vapor infiltration process can be controlled to achieve a desired property of the inorganic-organic polymer hybrid material.

In any of the embodiments disclosed herein, the one or more parameters can comprise one or more parameters selected from the group consisting of a temperature in the reaction chamber, a pressure in the reaction chamber, a length of time of exposure of the polymer material to the metal precursor, a length of time of exposure to an oxidizing fluid, and a length of time between exposure to a metal precursor and exposure to an oxidizing fluid.

In any of the embodiments disclosed herein, the oxidizing fluid can comprise one or more of water vapor, oxygen, and hydrogen peroxide.

In any of the embodiments disclosed herein, the polymer material can be a synthetic polymer material.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIGS. 6A-C illustrate alizarin dye saturation experiments for AlOx/PET hybrid fabrics infiltrated at 80 and 140° C. to different inorganic loadings, in accordance with some embodiments of the present disclosure. FIG. 6A provides photographs of dyed fabrics as a function of time in dye bath. FIGS. 6B-C provide UV-vis spectra for undyed and dyed hybrid AlOx/PET fabrics infiltrated at 80° C. (FIG. 6B) and 140° C. (FIG. 6C) with variable inorganic loading.

FIGS. 7A-B provide photographs of neat and hybrid AlOx/Kevlar infiltrated at 80 and 140° C. (FIG. 7A) and neat and hybrid AlOx/PAN infiltrated at 80 and 140° C. (FIG. 7B) after dyeing with alizarin, in accordance with some embodiments of the present disclosure.

FIG. 8 provides photographs of UV resist patterned hybrid AlOx/PET infiltrated at 140° C. and then dyed with alizarin, in accordance with some embodiments of the present disclosure.

FIGS. 9A-B provide photographs of neat PET (FIG. 9A) and hybrid AlOx/PET (FIG. 9B) infiltrated at 80° C. then dyed with osage orange and *Dactylopius coccus*, in accordance with some embodiments of the present disclosure.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Vapor-phase infiltration (VPI) creates hybrid organic-inorganic materials from polymeric prefactors, modifying material properties while generally maintaining macroscale forms. During VPI, polymers can be exposed to vapor-phase metalorganic or metal halide precursors that sorb within the polymer's subsurface and often are co-reacted with oxidants to create metal oxides. Depending upon precursor chemistry, polymer chemistry, and VPI processing parameters, the physical and chemical structures of the hybrid material can be tuned. As a result, VPI has been studied for modifying a wide range of material properties including electrical conductivity, mechanical strength, degradation resistance (UV, chemical, and thermal), catalysis, and photoluminescence. Additionally, VPI has been employed as an inorganic templating and phase contrast methodology. Based upon these properties, VPI is of interest in a variety of industrial areas including solar cells chemical separations, nanofabrication, and textile finishing. As discussed below, various embodiments of the present disclosure can utilize VPI processes to improve the dyeability of polymer materials, such as synthetic fabrics.

Figure 1:
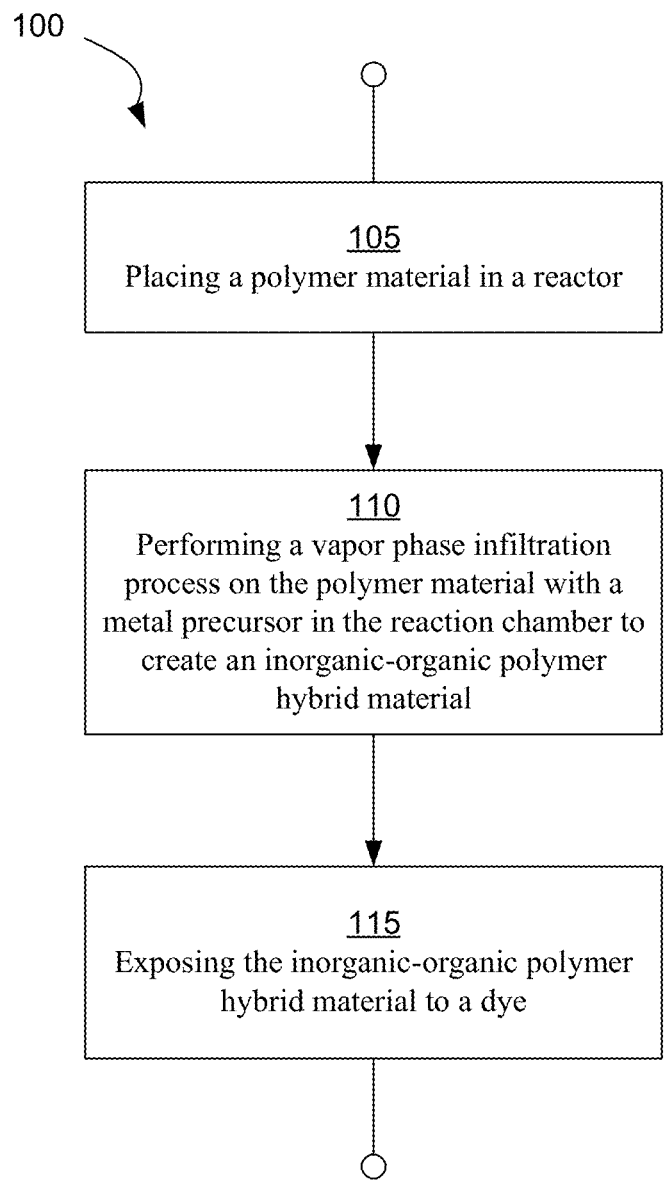
FIG. 1 provides a flow chart of a method of affixing molecules to a polymer material, in accordance with some embodiments of the present disclosure.

As shown in FIG. 1, an exemplary embodiment of the present disclosure provides a method of dying a polymer material 100. The method 100 can comprise: placing the polymer material in a reaction chamber 105; performing a vapor phase infiltration (VPI) process on the polymer material with a metal precursor in the reaction chamber to create an inorganic-organic polymer hybrid material 110; and exposing the inorganic-organic polymer hybrid material to a dye 115.

Figure 2:
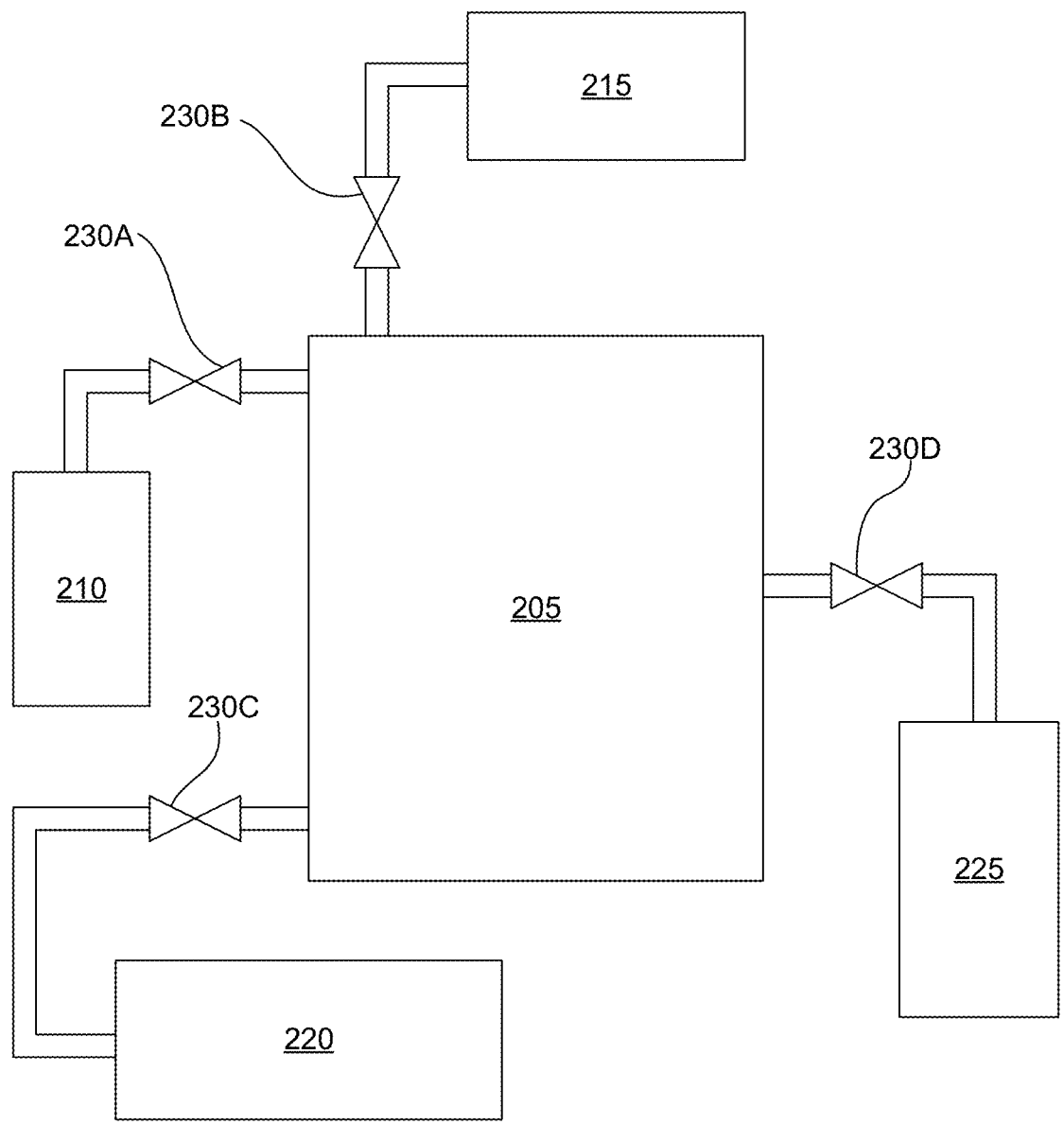
FIG. 2 provides a schematic diagram of a system for affixing molecules to a polymer material, in accordance with some embodiments of the present disclosure.

FIG. 2 provides an exemplary schematic diagram of a system that can be used to perform one or more steps of the methods disclosed herein. As shown in FIG. 2, the system can comprise a reaction chamber 205, an oxidizing fluid supply 210, a purge fluid supply 215, a vacuum pump 220, and a precursor supply 225. Each of the oxidizing fluid supply 210, purge fluid supply 215, vacuum pump 220, and precursor supply 225 can be in fluid communication with the reaction chamber via, e.g., one or more valves 230A-D.

The polymer material can be many different polymer materials known in the art, including, but not limited to, polyester (including polyester fibers and fabrics, e.g., Dacron®, polyethylene terephthalate, kevlar (para-aramid), polyacrylonitrile (PAN), nylon, cellulose acetate, spandex, aramid, nomex, rayon, acrylic, polyurethane, polyethylene, polypropylene, polystyrene, neoprene, Modal®, lyocell, acetate, cupro, and Tencel®. In some embodiments, the polymer material can be a synthetic polymer material. In some embodiments, the polymer material can be a synthetic polymer fabric. In other embodiments the polymer may have other geometric form factors including polymer beads, powders, sheets, films, fibers, or non-woven mats.

When the polymer material is placed in the reaction chamber 205, the reaction chamber 205 can be heated. In some embodiments, the reaction chamber 205 can be heated to a temperature of at least 25° C., at least 50° C., at least 75° C., at least 100° C., at least 125° C. at least 150° C., at least 175° C. at least 200° C., at least 225° C. at least 250° C., at least 275° C. at least 300° C., at least 325° C. at least 350° C., at least 375° C., or at least 400° C. In some embodiments, the reaction chamber 205 can be heated to a temperature of no more than 400° C., no more than 375° C., no more than 350° C., no more than 325° C., no more than 300° C., no more than 275° C., no more than 250° C., no more than 225° C., no more than 200° C., no more than 175° C., no more than 150° C., no more than 125° C., no more than 100° C., no more than 75° C., or no more than 50° C. In some embodiments the reaction chamber 205 is heated to a temperature of between any of the upper and lower limits disclosed above, for example, 25-400° C., 75-150° C., 100-250° C., and the like.

In any of the embodiments disclosed herein, the VPI process 110 can comprise decreasing a pressure inside the reaction chamber 205. For example, in some embodiments, after the polymer material is placed in the reaction chamber 205, the pressure of the reaction chamber 205 can be decreased to less than atmospheric pressure, e.g., approximately 30 mTorr, using the vacuum pump 220.

In some embodiments, the VPI process 110 can comprise removing at least a portion of sorbed water in the polymer material. For example, in some embodiments, the reaction chamber 205 can be purged with a purge fluid, e.g., nitrogen, from the purge fluid supply 215 to remove a portion of sorbed water in the polymer material. The purging can occur of varying periods of time, e.g., about 2 hours, and/or at varying pressures, e.g., about 1.5 Torr.

In some embodiments, the VPI process 110 can comprise exposing the polymer material to the metal precursor. In some embodiments, exposing the polymer material to the metal precursor can comprise opening a valve 230D between the reaction chamber and the precursor supply. The metal precursor can be many different metal precursors known in the art, including, but not limited to, trimethylaluminum (TMA) or other metal alkyls, titanium tetrachloride or other metal halides, metal cyclopentadienyls, metal alkoxides, metal amidinates, or other inorganic precursors that can achieve sufficient vapor pressures at the appropriate processing conditions, and the like. The polymer material can be exposed to the metal precursor when the metal precursor is in a vapor phase. The reaction chamber 205 containing the polymer material and metal precursor can then be placed at a static hold for a period of time. The duration of the exposure of the polymer material to the metal precursor can vary in accordance with various embodiments of the present disclosure. In some embodiments, the polymer material can be exposed to the metal precursor for a period of time of at least 1 second, at least 30 seconds, at least 1 minute, at least 5 minutes, at least 10 minutes, at least 15 minutes, at least 30 minutes, at least 1 hour, at least 2 hours, at least 3 hours, at least 4 hours, at least 5 hours, at least 6 hours, at least 8 hours, at least 10 hours, at least 12 hours, at least 18 hours, at least 24 hours, at least 36 hours, or at least 48 hours. In some embodiments, the polymer material can be exposed to the metal precursor for a period of time of no more than 48 hours, no more than 36 hours, no more than 24 hours, no more than 18 hours, no more than 12 hours, no more than 10 hours, no more than 8 hours, no more than 6 hours, no more than 5 hours, no more than 4 hours, no more than 3 hours, no more than 2 hours, no more than 1 hour, no more than 30 minutes, no more than 15 minutes, no more than 10 minutes, no more than 5 minutes, no more than 1 minute, or no more than 30 seconds. In some embodiments the polymer material can be exposed to the metal precursor for a duration of time ranging between any of the upper and lower limits disclosed above, for example, 1-24 hours, 6-36 hours, and the like. During exposure to the metal precursor, the metal precursor can sorb into at least a portion of the polymer material.

After exposure of the polymer material to the metal precursor, in some embodiments, the reaction chamber 205 can then be purged, e.g., a nitrogen purge, to remove residual precursor vapor from the reaction chamber 205. Accordingly, in some embodiments, the VPI process 110 can further comprise purging the reaction chamber using a purge fluid, e.g., nitrogen gas.

In some embodiments, the VPI process 110 can comprise exposing the polymer material to an oxidizing fluid to co-react with the metal precursor. In some embodiments, exposing the polymer material to an oxidizing fluid to co-react with the metal precursor can comprise opening a valve 230A between the reaction chamber 205 and the oxidizing fluid supply 210. The oxidizing fluid can be many different oxidizing fluids known in the art, including, but not limited to, water vapor, oxygen, hydrogen peroxide, and the like. The reaction chamber containing the polymer material (with sorbed precursor) and oxidizing fluid can then be placed at a static hold for a period of time. The duration of the exposure of the polymer material to the oxidizing fluid can vary in accordance with various embodiments of the present disclosure. In some embodiments, the polymer material can be exposed to the oxidizing fluid for a period of time of at least 1 second, at least 30 seconds, at least 1 minute, at least 5 minutes, at least 10 minutes, at least 15 minutes, at least 30 minutes, at least 1 hour, at least 2 hours, at least 3 hours, at least 4 hours, at least 5 hours, at least 6 hours, at least 8 hours, at least 10 hours, at least 12 hours, at least 18 hours, at least 24 hours, at least 36 hours, or at least 48 hours. In some embodiments, the polymer material can be exposed to the oxidizing fluid for a period of time of no more than 48 hours, no more than 36 hours, no more than 24 hours, no more than 18 hours, no more than 12 hours, no more than 10 hours, no more than 8 hours, no more than 6 hours, no more than 5 hours, no more than 4 hours, no more than 3 hours, no more than 2 hours, no more than 1 hour, no more than 30 minutes, no more than 15 minutes, no more than 10 minutes, no more than 5 minutes, no more than 1 minute, or no more than 30 seconds. In some embodiments the polymer material can be exposed to the oxidizing fluid for a duration of time ranging between any of the upper and lower limits disclosed above, for example, 1-24 hours, 6-36 hours, and the like. During exposure to the oxidizing fluid, the metal precursor sorbed into the polymer material and the oxidizing fluid can co-react to form an inorganic-organic polymer hybrid material, e.g., an $AlO_xH_y$/polymer hybrid material.

In any of the embodiments disclosed herein, one or more parameters of the VPI process 110 can be controlled to achieve a desired property of the inorganic-organic polymer hybrid material. The parameters that can be controlled, include, but are not limited to, a temperature in the reaction chamber 205, a pressure in the reaction chamber 205, a length of time of exposure of the polymer material to the metal precursor, a length of time of exposure to an oxidizing fluid, and a length of time between exposure to a metal precursor and exposure to an oxidizing fluid.

EXAMPLES

Disclosed below is an exemplary process of using a VPI process to affix molecules of naturally derived dyes to polymer surfaces. These examples are for illustration purposes only and should not be construed as limiting the scope of the present disclosure.

VPI was performed under variable levels of vacuum in a custom-built reactor with the precursor trimethylaluminum (TMA) and co-reactant water vapor. The fabrics were infiltrated at temperatures of 80 and 140° C. Fabrics first underwent a nitrogen purge step (~1 Torr) to remove any sorbed water followed by a static hold of TMA for several hours. The chamber was then purged to remove the residual precursor vapor and the fabrics were then exposed to a static water vapor environment to produce air-stable $AlO_xH_y$/polymer hybrids.

Figure 3A:
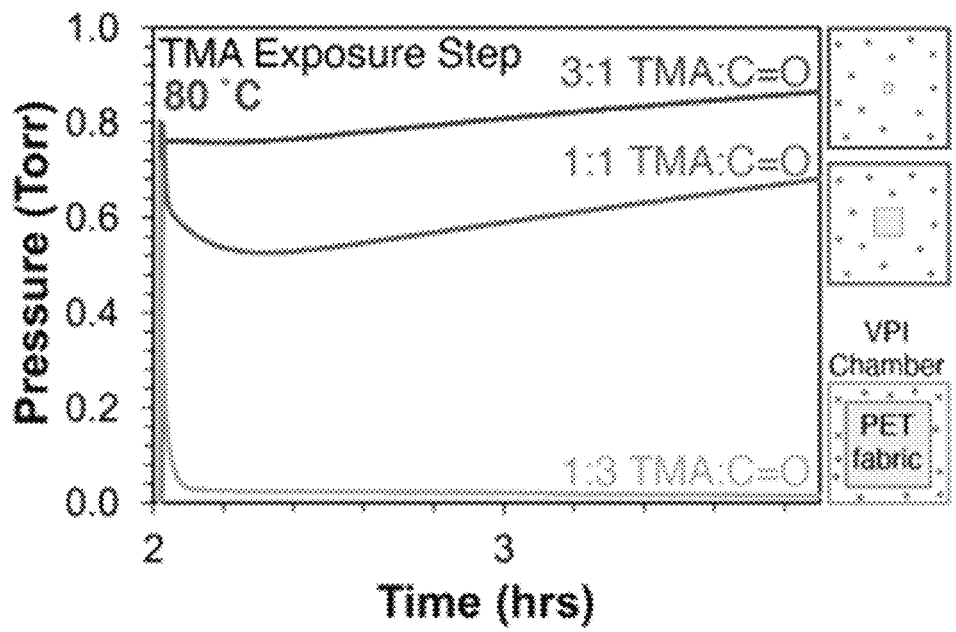
FIG. 3A provides a plot of in situ pressure during the TMA exposure step of a VPI process for infiltration of PET fabrics with TMA:C=O ratios of 3:1, 1:1, and 1:3 at 80° C. with accompanying schematics demonstrating how fabric mass was used to vary the TMA:C=O ratio, in accordance with some embodiments of the present disclosure.
Figure 3B:
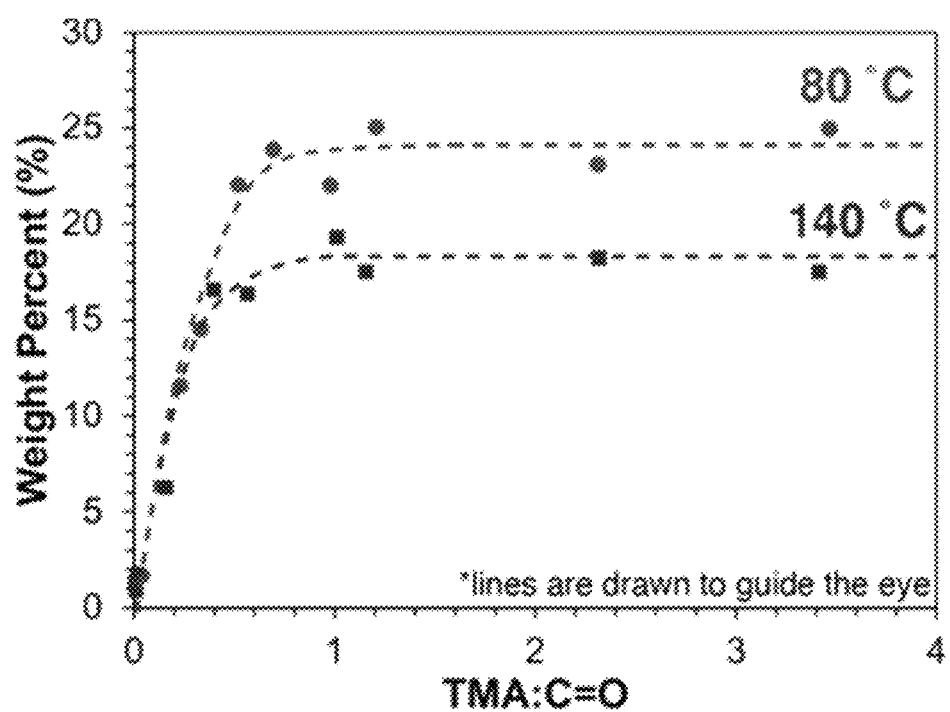
FIG. 3B provides a plot of inorganic loading measured by TGA as a function of TMA:C=O ratio for $AlO_x$/PET fabrics infiltrated at 80 and 140° C., in accordance with some embodiments of the present disclosure.

In addition to varying temperature, the inorganic loading of the hybrid fabrics was controlled through the ration of approximate moles of precursor introduced to approximate moles of reactive polymer functional groups (calculated from fabric mass). FIGS. 3A-B shows this controlled inorganic loading of the hybrid $AlO_xH_y$/PET fabrics infiltrated at 80 and 140° C. as measured by thermogravimetric analysis in air.

In this way, the inorganic loading of hybrid $AlO_xH_y$-PET fabrics was controlled and optimized for dyeability while minimizing impact on key fabric mechanical properties. High ratios of TMA to the polymer functional groups (carbonyl groups, corresponding to high quantities of inorganic) led to the formation of hybrid fabrics that were rigid and brittle in nature and turned yellow at higher infiltration temperatures. Reducing the TMA to functional group ratio better preserved fabric properties relevant to the textile industry such as color, flexibility, and wash fastness of the inorganic. Additionally, the infiltration process induced photoluminescence in the hybrid materials.

Figure 4:
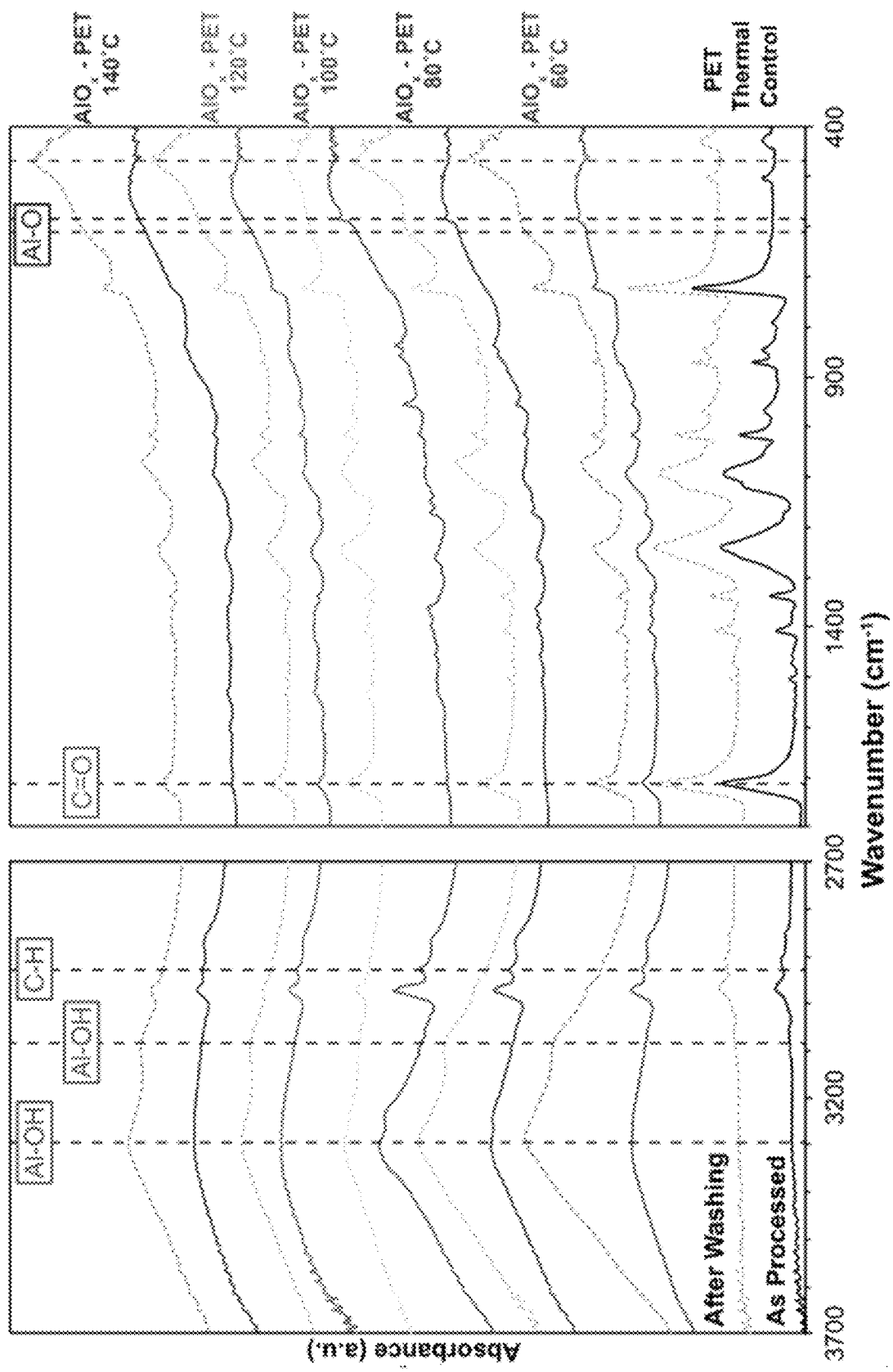
FIG. 4 provides a plot of FTIR spectra of control PET and PET fabrics maximally infiltrated with TMA (1:1 TMA to carbonyl) before and after simulated washing at 60-140° C. including a thermal control created using a VPI protocol without precursor dosing at 140° C., in accordance with some embodiments of the present disclosure.

The chemical structure of hybrid AlOx/PET fabrics were explored using FTIR (FIG. 4). At low temperatures (80° C.), the resulting hybrid contains inorganic clusters not strongly bound to the polymer chain while at high temperatures (140° C.) the inorganic is chemically bound via the carbonyl group. Regardless of infiltration temperature, large peaks appear corresponding to new bonding environments such as Al—O and Al—OH.

Figure 5A:
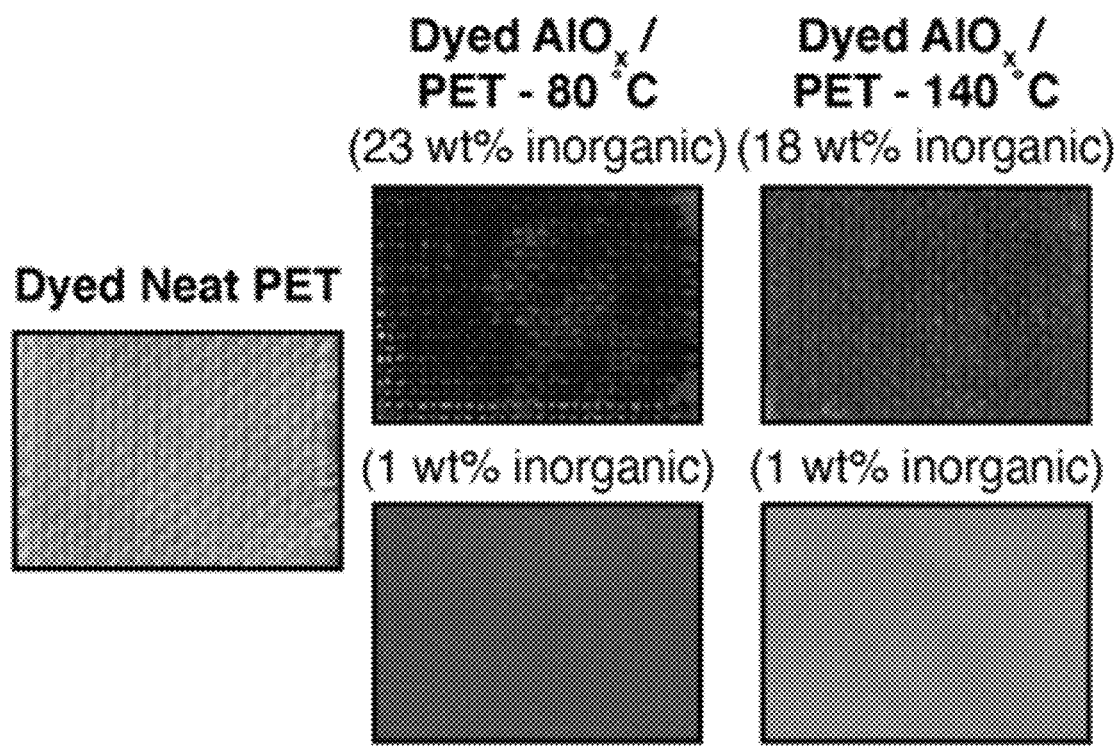
FIGS. 5A-B provide photographs and UV-Vis spectra, respectively, of neat and hybrid AlOx/PET hybrid fabrics infiltrated at 80 and 140° C. at low and high levels of inorganic loading after dyeing with alizarin, in accordance with some embodiments of the present disclosure.
Figure 5B:
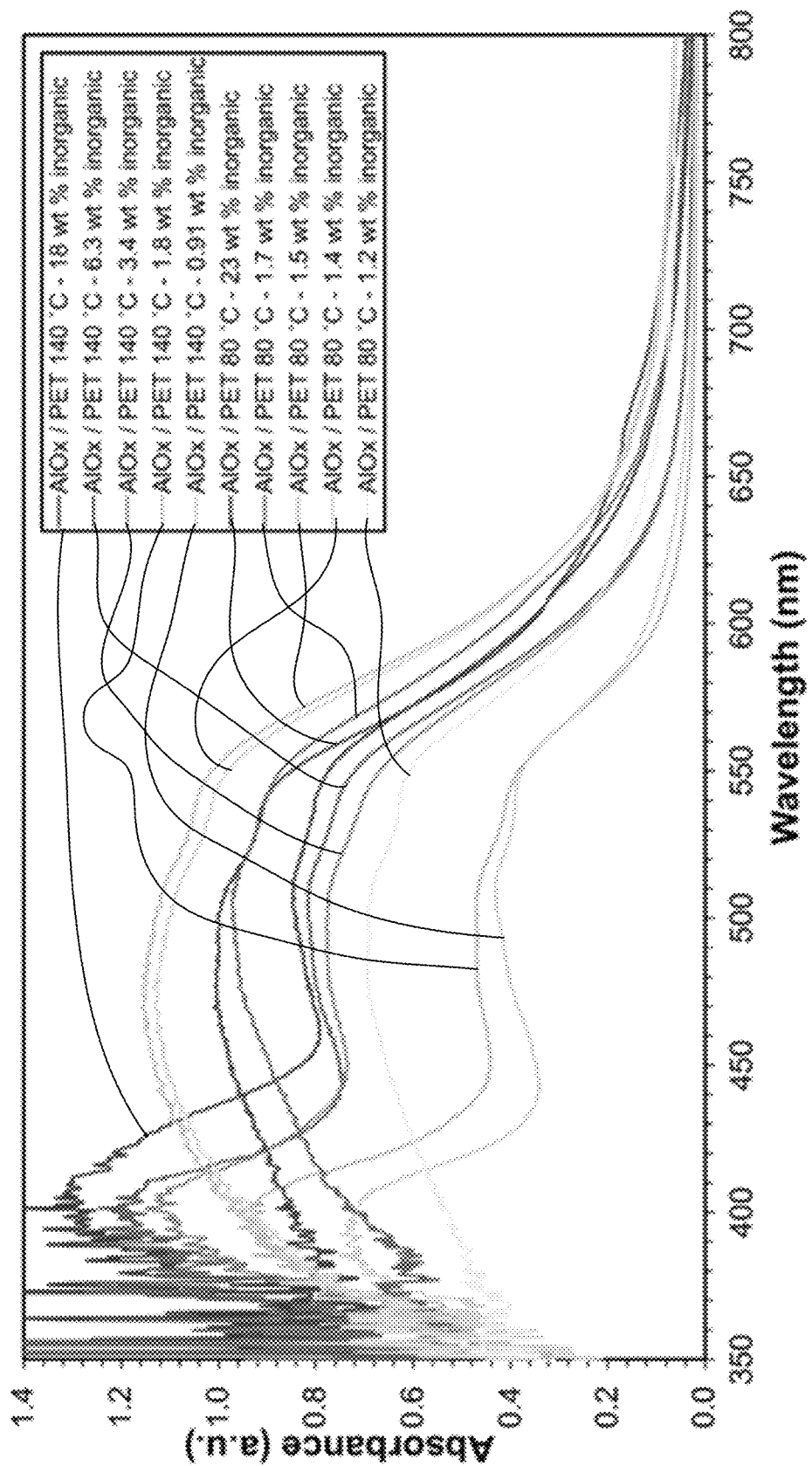

Neat PET and hybrid $AlO_xH_y$/PET fabrics infiltrated at 80 and 140° C. with varying amounts of inorganic loading were then dyed with alizarin (derived from madder root) by soaking them in a dye solution (in water). The dye absorbance was quantified with UV-Vis spectroscopy as well as photographed (FIGS. 5A-B). Neat PET fabrics did not dye significantly and remain their base white color. Hybrid fabrics regardless of condition demonstrate a significant change in color. Strength of color was found to vary with both infiltration temperature and inorganic loading. Overall, low quantities of inorganic achieved some quantity of color allowing for the optimization of fabric color and textile comfort related properties.

In addition to optimizing strength of color and textile comfort, the time to dye saturation was also explored by varying dye times and quantifying with UV-Vis as well as photographing (FIGS. 6A-C). Hybrid fabrics created at 80° C. with ~1 weight percent inorganic demonstrated saturation of color within less than a day, although some variability was observed. Hybrid fabrics infiltrated at 140° C. with approximately 1, 2, and 3 weight percent inorganic revealed a clearer time to saturation dependence, but also reached saturation within a day of dyeing. Overall, by exploring dye saturation curves for different inorganic loadings and infiltration temperatures, kinetic information was gathered to further optimize this dyeing process for industrialization.

Hybrid $AlO_xH_y$/PET hybrid fabrics infiltrated (but not dyed) at 140° C. were previously observed to fade in their inherent yellow color and photoluminescence under UV light exposure. Using vinyl cut stickers as patterns, infiltrated fabrics were patterned under UV light. UV-exposed areas demonstrated different dyeability from exposed areas potentially opening opportunities for patterning applications (FIGS. 7A-B).

To expand this work beyond PET fabrics and alizarin dye, additional polymers and naturally derived dyes were explored. Kevlar and polyacrylonitrile (PAN) fabrics infiltrated at 80 and 140° C. with alizarin both demonstrated improve dyeability (FIG. 8).

Hybrid $AlO_xH_y$/PET fabrics infiltrated at 80° C. further demonstrated significant dyeability with naturally derived dyes osage orange and *Dactylopius coccos* (cochineal beetle) as shown in FIGS. 9A-B.

Overall, using VPI as a vapor phase mordanting process to fix natural dyes to PET fabrics illustrates the impact that even small quantities of the vapor deposited inorganic can create enough of a base for dye to adhere to, highlighting the practical use of these fabrics in the field of textiles, but with the potential to improve molecular adhesion of molecules to polymer surfaces in other fields as well.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:
1. A method of affixing molecules to a polymer material, comprising:
placing the polymer material in a reactor;
removing at least a portion of sorbed water present in the polymer material;

exposing the polymer material to a metal precursor to produce an inorganic-organic polymer hybrid material; and soaking the polymer hybrid material in a solution comprising the molecules.

2. The method of claim 1, further comprising exposing the polymer material to an oxidizing fluid.

3. The method of claim 1, wherein the metal precursor comprises trimethylaluminum (TMA).

4. The method of claim 1, wherein the metal precursor is in the vapor phase.

5. The method of claim 1, wherein the polymer material is exposed to the metal precursor for a period of time of at least 1 second.

6. The method of claim 1, wherein the metal precursor sorbs into the polymer material.

7. The method of claim 1, wherein placing the polymer material in the reactor comprises placing the polymer material in a reaction chamber comprising TMA and co-reactant water vapor.

8. The method of claim 1, wherein the reaction chamber is at a temperature of between about 50° C. and 200° C. for at least a portion of the method.

9. The method of claim 1, wherein the polymer hybrid material is air-stable.

10. The method of claim 1, wherein the polymer material is selected from the group consisting of a polyester fabric, polyethylenetherephthalate, Kevlar, polyacrylonitrile (PAN), nylon, cellulose acetate, spandex, aramid, nomex, rayon, acrylic, polyurethane, polyethylene, polypropylene, polystyrene, neoprene, Dacron, Modal, Lyocell, acetate, Cupro, and Tencel.

11. The method of claim 1, wherein the reactor comprises:
a reaction chamber;
a purge gas chamber in fluid communication with the reaction chamber;
a water source in fluid communication with the reaction chamber;
a vacuum pump configured to apply a vacuum to the reaction chamber; and
a precursor source in fluid communication with the reaction chamber.

12. The method of claim 1, wherein the polymer material is a synthetic fabric and the molecules comprise a dye.

13. A method of dying a polymer material, the method comprising:
placing the polymer material in a reaction chamber;
performing a vapor phase infiltration process on the polymer material with a metal precursor in the reaction chamber to create an inorganic-organic polymer hybrid material; and
exposing the inorganic-organic polymer hybrid material to a dye.

14. The method of claim 13, further comprising heating the reaction chamber to a temperature between 25° C. and 400° C.

15. The method of claim 13, wherein the vapor phase infiltration process comprises:
decreasing a pressure inside the reaction chamber;
removing at least a portion of sorbed water in the polymer material;
exposing the polymer material to the metal precursor; and
exposing the polymer material to an oxidizing fluid to co-react with the metal precursor.

16. The method of claim 15, wherein the vapor phase infiltration process further comprises purging the reaction chamber using a purge gas.

17. The method of claim 13, wherein the one or more parameters of the vapor infiltration process are controlled to achieve a desired property of the inorganic-organic polymer hybrid material.

18. The method of claim 17, wherein the one or more parameters comprise one or more parameters selected from the group consisting of a temperature in the reaction chamber, a pressure in the reaction chamber, a length of time of exposure of the polymer material to the metal precursor, a length of time of exposure to an oxidizing fluid, and a length of time between exposure to a metal precursor and exposure to an oxidizing fluid.

19. The method of claim 13, wherein the oxidizing fluid comprises one or more of water vapor, oxygen, and hydrogen peroxide.

20. The method of claim 13, wherein the polymer material is a synthetic polymer material.

* * * * *